United States Patent
McCarthy, III (10) Patent No.: US 11,122,334 B2
(45) Date of Patent: Sep. 14, 2021

(54) METHODS AND APPARATUS FOR ACCESSING EXTERNAL DEVICES FROM A TELEVISION RECEIVER UTILIZING INTEGRATED CONTENT SELECTION MENUS

(75) Inventor: Bernard Anthony McCarthy, III, Atlanta, GA (US)

(73) Assignee: DISH Technologies L.L.C., Englewood, CO (US)

( * ) Notice: Subject to any disclaimer, the term of this patent is extended or adjusted under 35 U.S.C. 154(b) by 1798 days.

(21) Appl. No.: 12/857,727

(22) Filed: Aug. 17, 2010

(65) Prior Publication Data
US 2012/0047532 A1    Feb. 23, 2012

(51) Int. Cl.
| | |
|---|---|
| H04N 5/445 | (2011.01) |
| H04N 21/47 | (2011.01) |
| H04N 21/478 | (2011.01) |
| H04N 21/41 | (2011.01) |
| H04N 21/488 | (2011.01) |

(52) U.S. Cl.
CPC ......... *H04N 21/47* (2013.01); *H04N 21/4104* (2013.01); *H04N 21/478* (2013.01); *H04N 21/488* (2013.01)

(58) Field of Classification Search
CPC .. H04N 5/44543; H04N 21/482; H04N 21/84; H04N 21/4821; H04N 21/4345; H04N 21/478; H04N 21/4104; H04N 21/488; H04N 21/47
USPC .............................. 725/87–118; 709/217–231
See application file for complete search history.

(56) References Cited

U.S. PATENT DOCUMENTS

| | | | | |
|---|---|---|---|---|
| 5,410,326 A * | 4/1995 | Goldstein | .............. | H04N 5/765 348/734 |
| 5,956,716 A * | 9/1999 | Kenner et al. | | |
| 6,816,172 B1 * | 11/2004 | Iki | ...................... | G06F 3/04817 715/716 |
| 6,973,130 B1 * | 12/2005 | Wee | .......................... | G06T 9/20 375/240.08 |
| 7,337,459 B1 * | 2/2008 | Tsutsui | ................... | H04H 40/90 725/59 |
| 7,577,979 B2 * | 8/2009 | Feinleib | ................. | H04N 7/163 709/217 |
| 7,917,933 B2 * | 3/2011 | Thomas et al. | .................. | 725/88 |
| 8,813,138 B2 * | 8/2014 | Warrick | ................ | H04W 76/02 725/74 |
| 2002/0154892 A1 * | 10/2002 | Hoshen et al. | ................ | 386/87 |

(Continued)

*Primary Examiner* — Annan Q Shang
(74) *Attorney, Agent, or Firm* — Seed IP Law Group LLP (57) ABSTRACT

Described herein are systems, methods and apparatus which allow users to remotely access content from other devices. One embodiment provides a method for presenting available content to a user via a television receiver. A first content selection menu is output for display that includes at least a first content selection item associated with locally accessible content and a second content selection item associated with an external device. Responsive to a request associated with the second content selection item, the method includes outputting for display a second content selection menu. The second content selection menu specifies at least one content item remotely available through the external device. A user provides a selection of the at least one content item and the television receiver receives the selected content item from the external device and outputs the selected content item for presentation by a presentation device.

17 Claims, 7 Drawing Sheets

(56) References Cited

U.S. PATENT DOCUMENTS

| | | | |
|---|---|---|---|
| 2002/0174430 A1* | 11/2002 | Ellis | H04N 21/4751 725/46 |
| 2002/0181936 A1* | 12/2002 | Yuen | H04N 7/163 386/241 |
| 2002/0188944 A1* | 12/2002 | Noble | H04N 5/44543 725/39 |
| 2003/0126600 A1* | 7/2003 | Heuvelman | H04N 5/44543 725/35 |
| 2003/0149988 A1* | 8/2003 | Ellis | H04N 5/44543 725/87 |
| 2003/0220100 A1* | 11/2003 | McElhatten | H04N 21/26291 455/418 |
| 2004/0244030 A1* | 12/2004 | Boyce | G11B 19/025 725/25 |
| 2005/0028208 A1* | 2/2005 | Ellis | H04N 7/173 725/58 |
| 2005/0076092 A1 | 4/2005 | Chang et al. | |
| 2005/0159823 A1* | 7/2005 | Hayes | G05B 15/02 700/19 |
| 2005/0229212 A1* | 10/2005 | Kuether | H04N 21/25816 725/58 |
| 2005/0246738 A1* | 11/2005 | Lockett | H04N 21/8547 725/43 |
| 2006/0026279 A1* | 2/2006 | Zigmond | H04L 12/2803 709/224 |
| 2006/0137005 A1* | 6/2006 | Park | H04L 29/12009 726/21 |
| 2006/0258459 A1* | 11/2006 | Davis | H04L 12/2814 463/40 |
| 2006/0259926 A1* | 11/2006 | Scheelke | H04N 5/4401 725/48 |
| 2007/0079340 A1* | 4/2007 | McEnroe | H04N 7/163 725/78 |
| 2007/0171198 A1* | 7/2007 | Yokozawa | G06F 3/1423 345/156 |
| 2008/0005676 A1* | 1/2008 | Evans | H04N 7/163 715/740 |
| 2008/0186979 A1* | 8/2008 | Kolar | H04L 12/2838 370/395.53 |
| 2008/0307485 A1* | 12/2008 | Clement | H04N 5/76 725/152 |
| 2008/0313690 A1* | 12/2008 | Tsang | H04N 21/25866 725/118 |
| 2009/0210912 A1* | 8/2009 | Cholas | H04N 5/4401 725/82 |
| 2009/0228936 A1* | 9/2009 | Davis | H04L 12/2814 725/80 |
| 2009/0320073 A1* | 12/2009 | Reisman | G06F 16/954 725/51 |
| 2010/0188575 A1* | 7/2010 | Salomons | H04N 5/50 348/553 |
| 2010/0272414 A1* | 10/2010 | Reneris | H04L 12/1895 386/291 |
| 2011/0162009 A1* | 6/2011 | Adimatyam | H04N 5/775 725/40 |
| 2011/0247036 A1* | 10/2011 | Adimatyam | H04N 21/4147 725/40 |

* cited by examiner

| | 7:00 | 8:00 | 8:30 |
|---|---|---|---|
| | | | (500) 7:00 - BASKETBALL GAME<br>THE TITANS FACE OFF AGAINST THE GIANTS IN A BITTER MATCH-UP BETWEEN THE LEAGUES BIGGEST GUYS |
| Tues, Jan 1 | | | |
| NATIONAL 498 | FUNNY GUYZ | | BEST SINGERS |
| THE NEWS 499 | NEWS OF THE DAY | NEWS OF THE DAY | NEWS OF THE DAY |
| SPORTS 500 | 210 | BASKETBALL GAME TITANS VS. GIANTS | |
| DEVICE 501 | MY DEVICES | | |
| DVR 502 | MOON WARS | | |
| DVR 503 | HOSTAGE SITUATION | | |

METHODS AND APPARATUS FOR ACCESSING EXTERNAL DEVICES FROM A TELEVISION RECEIVER UTILIZING INTEGRATED CONTENT SELECTION MENUS

BACKGROUND

Some television receivers, such as cable or satellite television receivers, allow users to access content stored on other devices, such as other television receivers, personal computers, cameras, web sites and the like. However, such access is typically provided through various menus Of the television receiver that are separate from menus utilized to access broadcast television programs (e.g., linear television channels). Furthermore, such menus are often difficult for users to utilize for accessing such devices and selecting remote content therefrom for viewing. Thus, easier ways of accessing remote content are desired that are more user friendly and intuitive.

BRIEF DESCRIPTION OF THE DRAWINGS

The same number represents the same element or same type of element in all drawings.

DETAILED DESCRIPTION OF THE DRAWINGS

The various embodiments described herein generally provide apparatus, systems and methods which facilitate the reception, processing, outputting and communication of content from one or more sources, via one or more communications mediums (of networks), to one or more communication devices for presentation to one or more end-users. More particularly, described herein are systems, methods and apparatus which allow users to remotely access content from other devices utilizing similar techniques as used for selecting locally receivable television programming. In at least one embodiment external devices may be accessed using content selection menus that facilitate the selection of linear channels, locally stored, content, external devices and/or remote content from one integrated menu. In some embodiments, selection of linear channels, locally stored content, external devices and/or remote content may be accessed using similarly configured content identifiers.

In at least one embodiment, external devices, such as other television receivers, cameras, web servers, personal computers, home media gateways and the like may be accessed utilizing content identifiers (e.g., channel identifiers) configured on a television receiver. For example, a group of linear channels may be assigned the channel numbers 1-20, and an external device, such as a security camera, may be accessed from the television receiver using the channel number 21. Likewise content stored on a personal computer may be accessed using the channel number 22 and content stored on a remotely located television receiver (e.g., on a friend or family member's DVR) may be accessed using channel number 23. Similarly, a content entry (e.g., a row or cell of the grid) displayed in an electronic programming guide may allow a user to access a particular external device from within the electronic programming guide. Thus, a user may access the content stored on the external devices by entering a channel number or selecting the device from the electronic programming guide on the television receiver.

In another embodiment, a particular channel number may be utilized to bring up a menu that facilitates the selection of a particular external device that is accessed by the television receiver to receive content therefrom. For example, entering channel 100 may bring up a menu allowing the user to access various external devices, such as a camera, a personal computer and a remotely located television receiver. The user may then select one of the devices to access content therefrom. In at least one embodiment, further menus may be displayed that facilitate, the selection of particular content stored on an external device. Similarly, a content entry displayed in an electronic programming guide may allow a user to access the list of devices via a second content/device selection menu from within the electronic programming guide.

Figure 1:
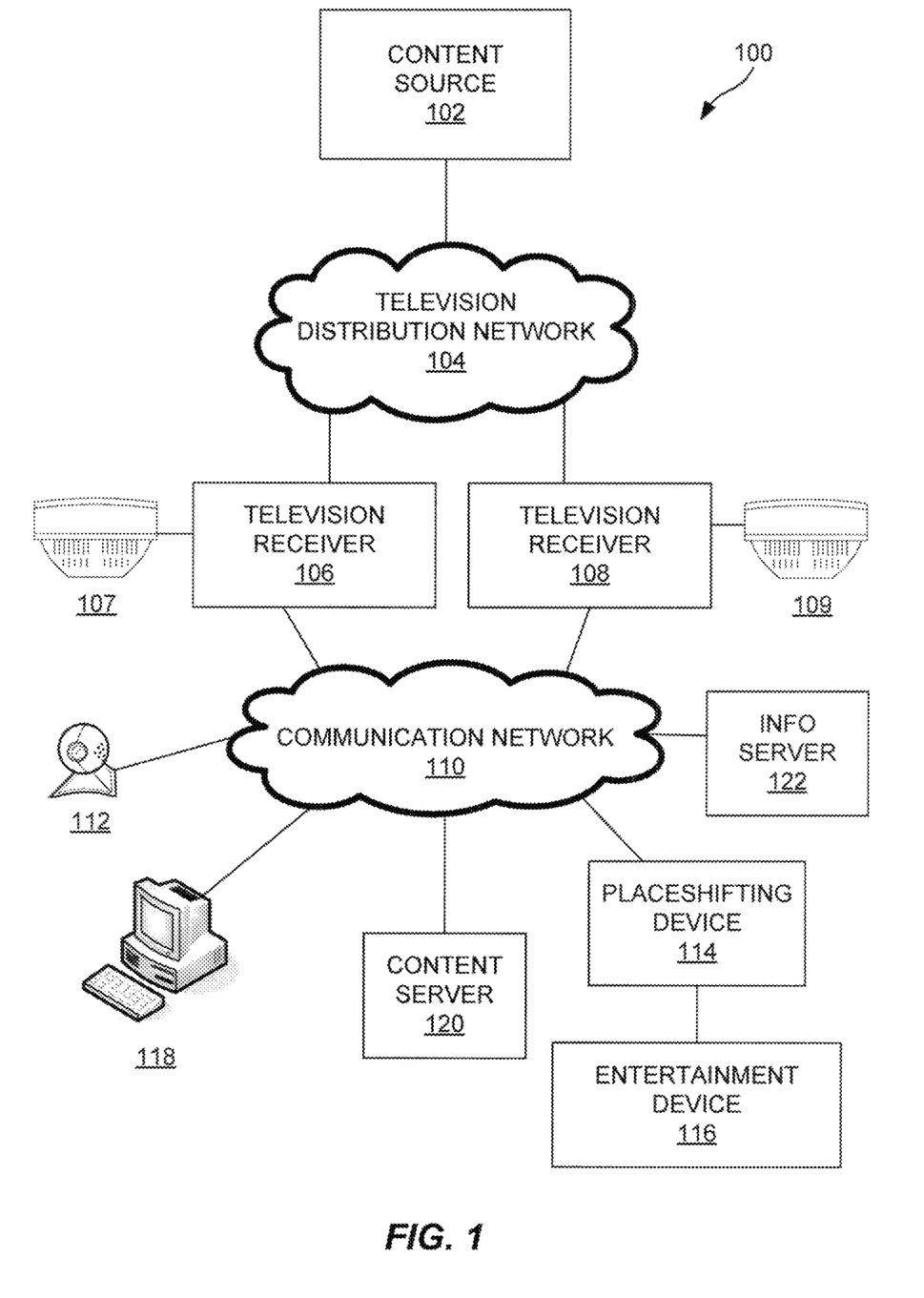
FIG. 1 illustrates an embodiment of a communication system.

FIG. 1 illustrates an embodiment of a communication system 100. The communication system 100 includes a content source 102, a television distribution network 104, a first television receiver 106, a first presentation device 107, a second television receiver 108, a second presentation device 109, a communication network 110, a camera 112, a placeshifting device 114, an entertainment device 116, a personal computer 118, a content server 120 and an info server 122. Each of these components is discussed in further detail below. The communication system 100 may include other components, elements or devices not illustrated for the sake of brevity.

The content source 102 is operable for receiving, generating and communicating content to one or more television receivers 106 and 108. The content to be received, processed, outputted and/or communicated may come in any of various forms including, but not limited to, audio, video, audio/video, data, information, or otherwise. In at least one embodiment, the content source 102 is operable for receiving various forms and types of content from other sources, aggregating the content and transmitting the content to the television receiver 106 through the television distribution network 104. It is to be appreciated that the content source 102 may receive practically any form and/or type of information from one or more sources including streaming or broadcast television programming, recorded audio, audio/video or video content, electronic programming guide data and the like.

The television distribution network 104 is operable to transmit content from the content source 102 to the television receivers 106 and 108. The television distribution network 104 may comprise any type of wired (e.g., cable and fiber) and/or wifeless (e.g., cellular, satellite, microwave; and other types of radio frequency) communication medium and any desired network topology (or topologies when multiple mediums are utilized). Exemplary television distribution networks 104 include terrestrial, cable, satellite and internet protocol television (IPTV) distribution systems. In at least one embodiment, the television distribution network 104 broadcasts or multicasts content to a plurality of television receivers 106 and 108. The television distribution network 104 may also, distribute content to a specific addressable television receiver 106 or 108, such as video-on-demand content and the like. In at least one embodiment, the content source 102 may be embodied as a transmission facility of the television distribution network 104. Exemplary content sources 102 include over-the-air (OTA) terrestrial transmission facilities, cable television distribution head-ends, satellite television uplink centers, broadband or internet servers and the like.

The television receivers 106 and 108 are operable to receive content from the television distribution network 104 and output the received content for presentation by an associated presentation device 107 or 109. In at least one embodiment, the presentation devices 107 and 109 are display devices (e.g., televisions) configured to display content to a user. The television receivers 106 and 108 may receive an audio/video stream in any format (e.g., analog or digital format) and likewise output the audio/video stream for presentation by a presentation device 107 or 109. In at least one embodiment, the television receiver 106 is a set-top box (e.g., a satellite television receiver, cable television receiver, terrestrial television receiver, internet protocol television (IPTV) receiver or any other type of receiver/converter box) or other similar device that processes and provides one or more audio and/or video output streams to the associated presentation device 107 or 109 for presentation to a user. The television receiver 106 may be further configured to output menus and other information that allow a user to control the output of audio/video content by the television receiver 106 and 108, view electronic programming guides, set recording timers and the like.

The presentation devices 107 and 109 may comprise any type of device capable of receiving and outputting a video signal in any format. Exemplary embodiments of the presentation devices 107 and 109 include a television, a computer monitor, a liquid crystal display (LCD) screen, a touch screen and a projector. The presentation device 107 and the television receiver 106 (as well as the presentation device 109 and the television receiver 108) may be communicatively coupled through any type of wired or wireless interface. For example, the presentation device 107 may be communicatively coupled to the television receiver 106 through a coaxial cable, component or composite video cables, a high-definition multimedia interface (HDMI) cable, a VGA or SVGA cable, a Bluetooth or WiFi wireless connection or the like. In some embodiments, the television receiver 106 and the presentation device 107 may be integrated as a device combining the functionality of a display device and a television receiver, such as a television with integrated CableCard functionality.

The presentation device 107 may be any device configured to receive an audio, video or audio/video stream from the television receiver 106 and present the content to a user. Examples of the presentation device 107 include a television, a video monitor or similar device, audio receiver or the like capable of presenting audio and/or video content to the user.

The communication network 110 is operable to communicatively couple the television receivers 106 and 108, the camera 112, the placeshifting device 114, the computer 118, the content server 120 and the info server 122, The communication network 110 may utilize any desired combination of wired (e.g., cable and fiber) and/or wireless (e.g., cellular, wireless, satellite, microwave, and radio frequency) communication mediums and any desired network topology (or topologies when multiple mediums are utilized). Exemplary communication networks include wifeless communication networks, public switched telephone networks (PSTN), and local area networks (LAN) or wide area networks (WAN) providing data communication services.

The camera 112 may be any device operable to capture video content. For example, the camera 112 may be embodied as a security camera or baby monitoring camera. The camera 112 may further include a microphone operable to capture audio data in association with the capturing of video content. In at least one embodiment, the camera 112 may be operable to communicate with the television receivers 106 and 108 through the communication network 110. More particularly, the camera 112 may be operable to format the captured video for transmission across the communication network 110 and include a network interface operable transmit the captured audio and/or video data to one or more of the television receivers 106 and 108. In another embodiment, the camera, 112 may be communicatively coupled to the television receivers 106 and/or 108 through an intermediate device, such as the placeshifting device 114.

The placeshifting device 114 is configured to receive audio/video content from an output device, such as the camera 112 of the entertainment device 116 and format and transmit the content through the communication network 110 to the television receivers 106 or 108 for presentation to a user. An exemplary placeshifting device is the SLING-BOX, distributed by Sling Media, Inc. of Foster City, Calif. The placeshifting device 114 may receive audio/video, content from an associated entertainment device 116 through any appropriate interface, such as coaxial cable, composite or component cables, HDMI, DVI and the like. Appropriate formatting of the audio/video content may include packetizing the, content for transmission across the communication network 110 in an internet protocol (IP) format. The entertainment device 116 may include any type of audio/video output device operable to provide audio/video content to the placeshifting device 114. Examples of the entertainment device 116 include a television receiver, a DVD or other optical disk player, a digital video recorder (DVR), a camera and the like. The placeshifting device 114 may also provide control instructions to the entertainment device 116 using any sort of infrared, radio frequency or other signal. Such signals may be provided for example from an "IR Blaster" or similar feature that emulates infrared or other RF instructions provided from a remote control associated with the entertainment device 116.

In at least one embodiment, the placeshifting device 114 may receive content from the entertainment device 116 in an analog format and digitize the content for transmission across the communication network 110. In other embodiments, the placeshifting device 114 may receive content from the entertainment device 116 in a digital format and perform appropriate formatting of the content for transmission across the communication network 110. For example, the placeshifting device 114 may transcode the content received from the entertainment device 116 into a lower bit-rate stream which may be more easily transmitted across the communication network 110.

The computer 118 may comprise any type of computing device operable to provide content to the television receivers 106 and/or 108 for output to an associated presentation device 107 or 109. Examples of the computer 118 include a laptop, personal computer, tablet PC and video gaming system. In at least one embodiment, the computer 118 may include any combination of software and/or hardware operable to format audio/video content stored or otherwise accessible thereon for transmission across the conmunication network to the television receivers 106 and/or 108. For example, server software operating on the computer 118 may access stored content responsive to a request from the television receivers 106 or 108 and packetize the content for transmission across the communication network 110.

In another embodiment, the computer 118 may be communicatively coupled to the television receivers 106 or 108 through a media catcher device (not shown in FIG. 1), such as the SLINGCATCHER distributed by Sling Media, Inc. A media catcher device includes hardware and/or software operable to capture content shown on screen of a computing device, packetize the content into an appropriate video stream and transmit the video stream to another device (e.g., the television receiver 106 or 108) for output and/or presentation.

The content, server 120 is operable to store and transmit content to the television receivers 106 and 108. The content server 120 may store and transmit any type of content using any type of transmission protocol. For example, the content server 120 may transmit streaming audio/video content to any of the television receivers 106 responsive to a request for specific content.

The optional info server 122 is operable to maintain a listing of available devices and/of content stored thereupon that may exchange data with the television receivers 106 and/or 108. For example, the info server 122 may maintain a network address location of the camera 112, the placeshifting device 114, the computer 118 and the content server 120. The television receivers 106 and 108 may connect with the info server 122 to request the network location of any of the aforementioned devices in order to initiate a connection thereto.

In at least one embodiment, the info server 122 may maintain a listing of content available on each of the television receiver 106 or 108, the camera 112, the placeshifting device 114/entertainment device 116, the computer 118 and/or the content server 120. For example, the content listings may specify content recorded/stored on any of the devices of linear channels or other content which is available via the devices. Such content listings may be updated periodically, or in real-time based on desired design criteria. The content listings may be transmitted to the television receiver 106 or 108, facilitating a user to select content for transfer from an associated device to the television receivers 106 or 108.

As described above, the techniques described herein facilitate the user selection of remote devices and content from the television receivers 106 and 108. The techniques will be described in the context of user access of content though the first television receiver 106. However, it is to be appreciated that similar techniques may be applied to the television receiver 108.

The television receiver 106 is configured to receive audio/video programming from the content source 102 through the television distribution network 104. For example, the television receiver 106 may be capable of receiving a plurality of linear television channels via the television distribution network 104. Channels are typically accessed by the user through the television receiver 106 using an associated content identifier (e.g., channel identifier or number) for the channel. For example, the content source 102 may transmit 500 different channels, each assigned a particular channel identifier from 1-500. A user may utilize a remote control keypad, in conjunction with the television receiver 106, for inputting a channel identifier to access a news network, such as channel number 105. In a particular distribution system, each user may access the same channel content using the same standard set of channel identifiers for the service.

In at least one embodiment, any of the devices external to the television receiver 106 may be assigned a similar channel identifier. For example, each of the television receiver 108, the camera 112, the placeshifting device 114, the computer 118 and the content server 120 may be assigned a channel identifier. In at least one embodiment, the external devices are assigned channel identifiers which are not assigned to any programming distributed by the television distribution network 104. For example, the television receiver 106 may be configured to allow a user to assign channel identifiers in a specific range, e.g., 501-510; or may allow the user to assign the external devices to any unused channel number not assigned in the television distribution network 104 (e.g., channel 273). Table #1 illustrates one embodiment of possible channel identifiers that may be assigned in the communication system 100.

TABLE #1

| User defined channel identifiers | |
|---|---|
| Mom's Television Receiver | 501 |
| Security Camera | 502 |
| Dad's slingbox | 503 |
| Bob's Computer | 504 |
| Frank's Media Server | 505 |

Thus, a user of the television receiver 106 may access the television receiver 108 by inputting the channel identifier "501" using an associated remote control. This would be similar to a user inputting the channel identifier "140" to access ESPN on the DISH NETWORK satellite service using the television receiver 106. Similarly, the user may access the camera 112 using the channel identifier "502", the placeshifting device 114 using the identifier "503", the computer 118 using the identifier "504" and the server 120 using the identifier "505".

In at least one embodiment, the television receiver 106 may connect to a specified device responsive to input of a channel identifier. For example, the television receiver 106 may communicatively couple to the placeshifting device 114 to initiate a placeshifting session responsive to input of the channel identifier "503". In at least one embodiment, the television receiver 106 may communicate with the info server 122 in order to identify a network location of the placeshifting device 114 for initiation of the placeshifting session. The television receiver 106 then receives content from the placeshifting device 114 and outputs the received content for presentation by the presentation device 107.

In some scenarios, it may be desirable to authenticate access to any of the television receiver 108, the camera 112, the placeshifting device 114, the computer 118 and/or the content server 120. For example, a user accessing any of the aforementioned devices from an external client may be prompted for a username, password or pin number prior to gaining access thereto. In at least one embodiment, the user of the television receiver 106 may be prompted for authorization credentials after inputting a channel identifier for a device. For example, the user may input the identifier "505" and may be responsively prompted for a username/password associated with access to the content server 120.

In at least one embodiment, the authentication process may be performed automatically without further prompting of user input from the user. For example, a user may initially configure their various accounts for devices through the television receiver 106 during a set-up process. When the user desires to access an external device, such as the camera 112, the authentication process is perform automatically, with the television receiver 106 accessing stored authentication credentials from memory and transmitting the credentials to the camera 112. Once the access request by the television receiver 106 is authenticated, the camera 112 begins transmitting content to the television receiver 106 for presentation by the presentation device 107. Thus, the user may input a channel identifier to access a device without logging into the external device each time.

The television receiver 106 may also display content selection menus, such as electronic programming guides, that display content selection items corresponding with one or more of the television receiver 108, the camera 112, the placeshifting device 114, the computer 1218 and/or the content server 120. Such devices may be presented in association with or separate from a corresponding channel identifier described herein.

Figure 2:
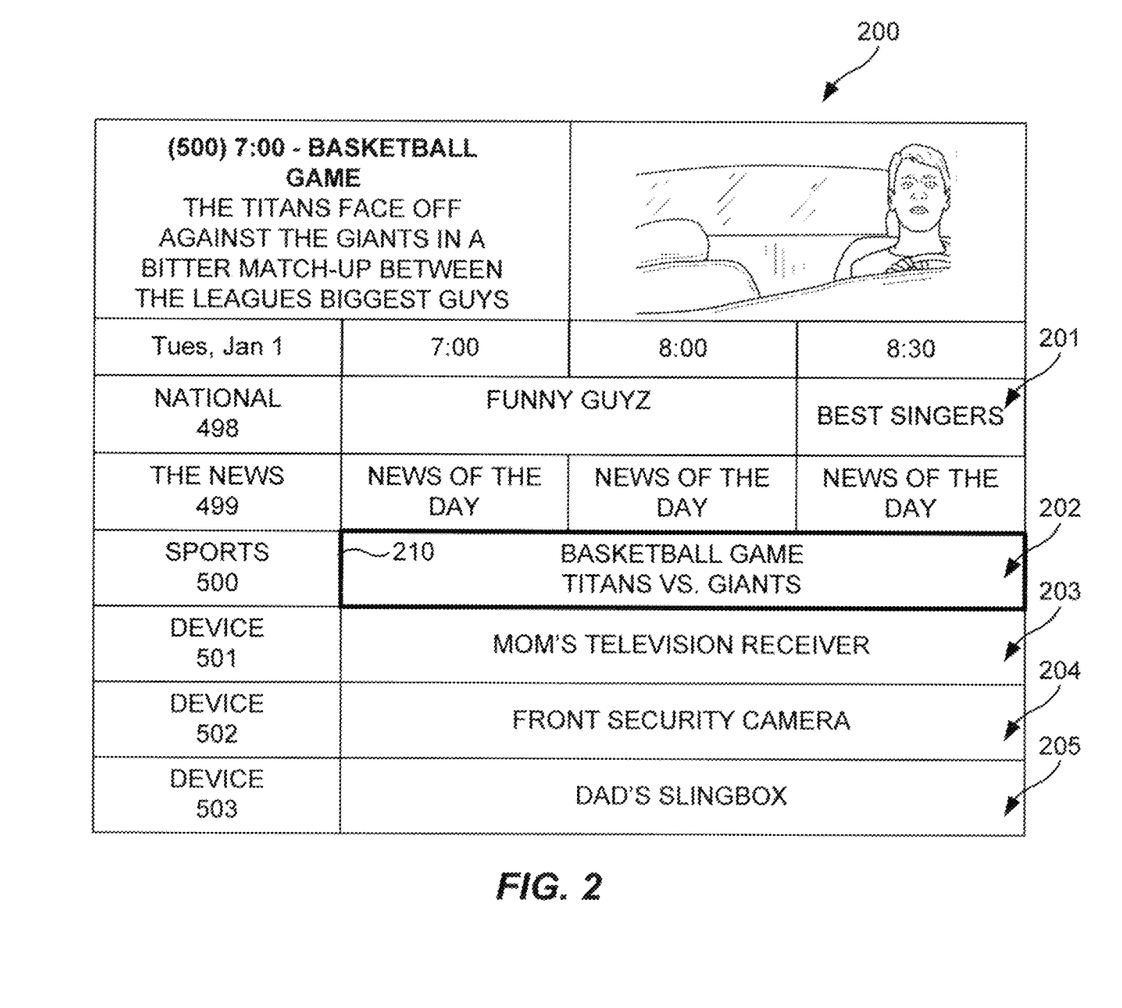
FIG. 2 illustrates an embodiment of an electronic programming guide output by the television receiver of FIG. 1.

FIG. 2 illustrates an embodiment of an electronic programming guide 200 output by the television receiver 108 of FIG. 1. The guide 200 allows a user of the television receiver 106 to access locally accessible content (e.g., linear channels) as well as externally accessible devices and/or content. As illustrated in FIG. 2, the guide 200 is configured as a grid having a plurality Of rows corresponding with different channels or devices. Furthermore, the guide 200 includes a plurality of columns corresponding with different time periods. A portion of the content identifiers (e.g., the cells) correspond with external devices, such as the camera 112, the television receiver 108 and/or the placeshifting device 114.

The guide 200 includes a plurality of content identifiers 201 and 202 that identify locally accessible content. The content identifier 201 allows the user to access the "Best Singers" program broadcast on channel "498." The content identifier 201 allows the user to access the "Basketball Game" on channel "500." For example, the user navigates the guide 200 using the cursor 210 to select a particular program for viewing.

The guide 200 further includes a plurality of content identifiers 203-205 that correspond with various external devices. For example, the content identifier 203 corresponds with the television receiver 106A, the content identifier 204 corresponds with the camera 112 and the content identifier 205 corresponds with the placeshifting device 114. By navigating the cursor 210 to the content identifier 204, the user can access the camera 112 via the television receiver 106 In at least one embodiment a user may alternatively enter a channel identifier associated with a desired content identifier 203-205 to access desired content stored on an external device. The content identifiers 203-205 may include any type of device or content description, depending on desired design criteria. For example, each cell for a particular device may span multiple time slots and identify a user assigned name for the external device.

In at least one embodiment, upon user selection of a particular content identifier 203-205, the television receiver 106 initiates a communication session with the associated external device and begins receiving content therefrom. For example, the television receiver 106 may begin receiving video camera footage from the camera 112 responsive to selection of the content identifier "204." As described above, the television receiver 106 may perform an automatic authentication process responsive to selection of the content identifiers 203-205 to authenticate access to a corresponding electronic device.

In at least one embodiment, the television receiver 106 may display a content selection menu responsive to selection of a particular content identifier 203-205. For example, the television receiver 106 may display the content selection menu 300 (see FIG. 3), which allows the user to access content on the camera 112 via the television receiver 106. The content selection menu 300 specifies various content items available on the camera 112. For example the content item 301 allows the user to view live video footage from the camera 112. Likewise, each of the content items 302-309 correspond with recorded video footage for various time periods. The user utilizes a remote control of other input device associated with the television receiver 106 to select one of the content items 301-309 for access. Responsive to a user selection, the television receiver 106 initiates a request for the corresponding content item 301-309. The camera 112 transmits the requested content to the television receiver 106 via the communication network 110 and the television receiver 106 outputs the corresponding audio/video content for presentation by the presentation device 107.

Figure 3:
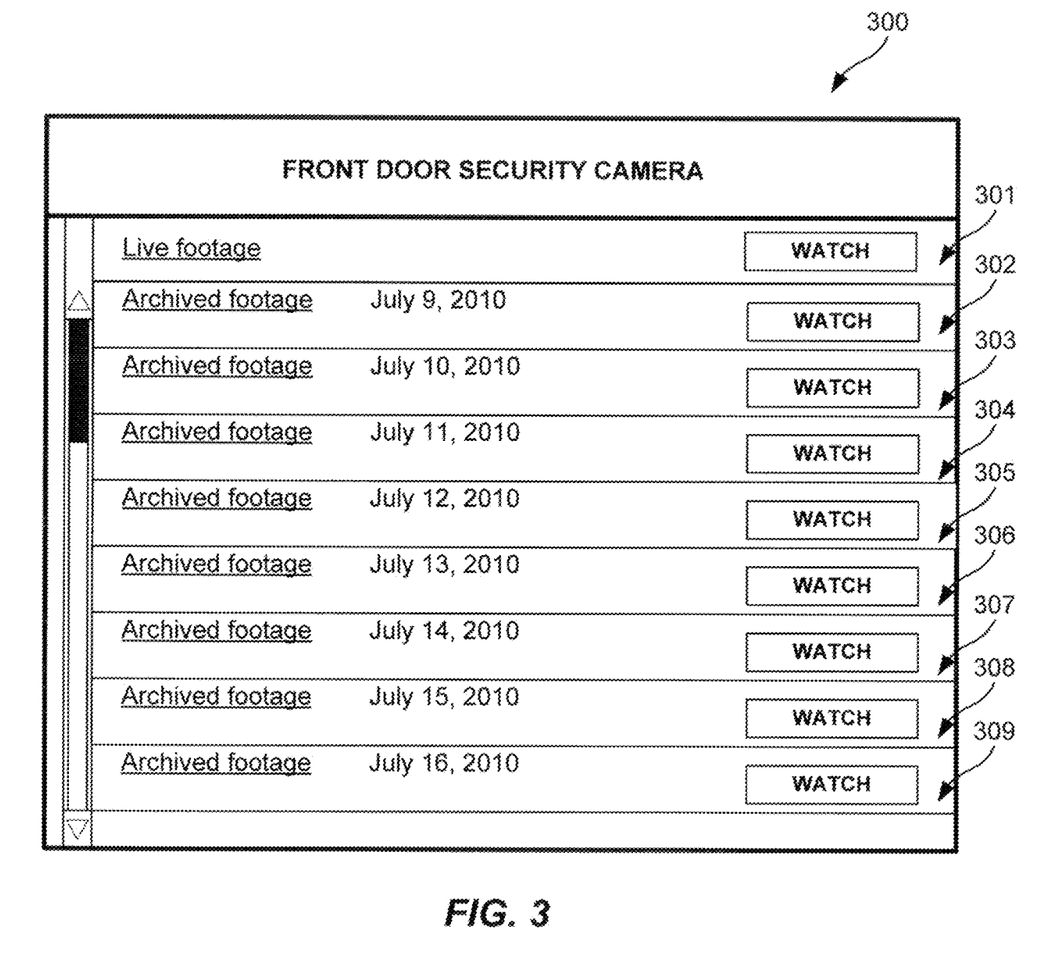
FIG. 3 illustrates an embodiment of a content selection menu.

Similar content selection menus may be utilized in association with access to any of the television receiver 108, the placeshifting device 114, the computer 118 and the content server 120. For example, a content selection menu output by the television receiver 106 may specify various programming recorded on the television receiver 108. The user may then select one or more audio/video programs stored on the television receiver 108, which streams the content to the television receiver 106 for output to the presentation device 107. Likewise, a content selection menu output by the television receiver 106 may specify various stored movies, television programs, photos, audio content and the like remotely accessible on the computer 118 or the content server 120 using the television receiver 106. Based upon a user selection, the television receiver 106 receives the selected content item from the external device and outputs a corresponding audio/video signal for presentation by the presentation device 106.

In at least one embodiment, a single channel identifier or content identifier within an electronic programming guide may allow the user to access a device selection menu that facilitates connection with various electronic devices. For example, input of the channel identifier "501" may prompt the television receiver 106 to display a device selection menu. Alternatively, a particular cell of an electronic programming guide may allow the user to access the device selection menu.

Figure 4:
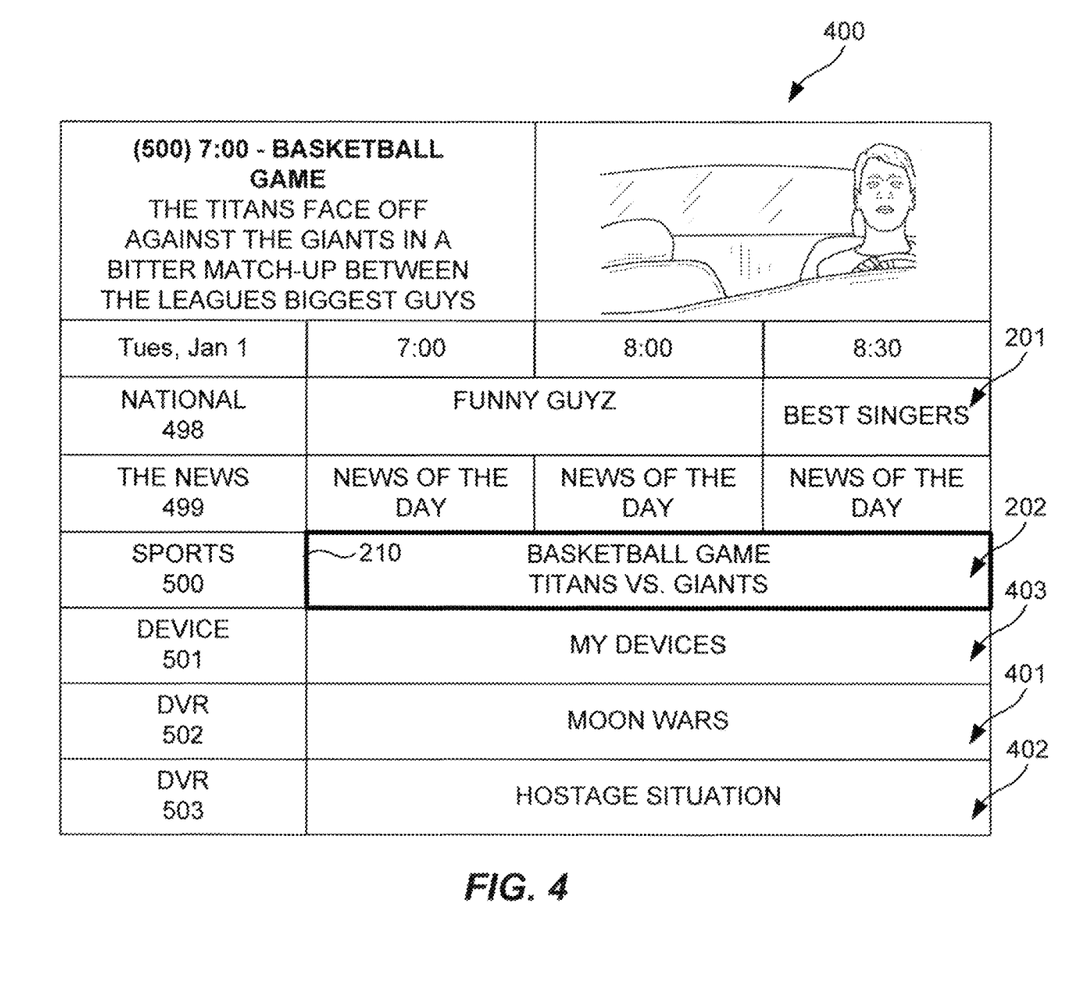
FIG. 4 illustrates another embodiment of an electronic programming guide.

FIG. 4 illustrates another embodiment of an electronic programming guide 400. As illustrated in FIG. 4, the guide 400 includes a plurality of content identifiers 201-202 which allow the user to access locally accessible content (e.g., linear television channels). Furthermore, in at least one embodiment, the guide 400 includes content identifiers 401 and 402 that allow the user to access content stored locally on the television receiver 106. For example, content identifier 401 allows the user to access the movie "Moon Wars" recorded by the television receiver 106. Likewise, the content identifier 402 allows the user to access the movie "Hostage Situation" recorded by the television receiver 106.

Figure 5:
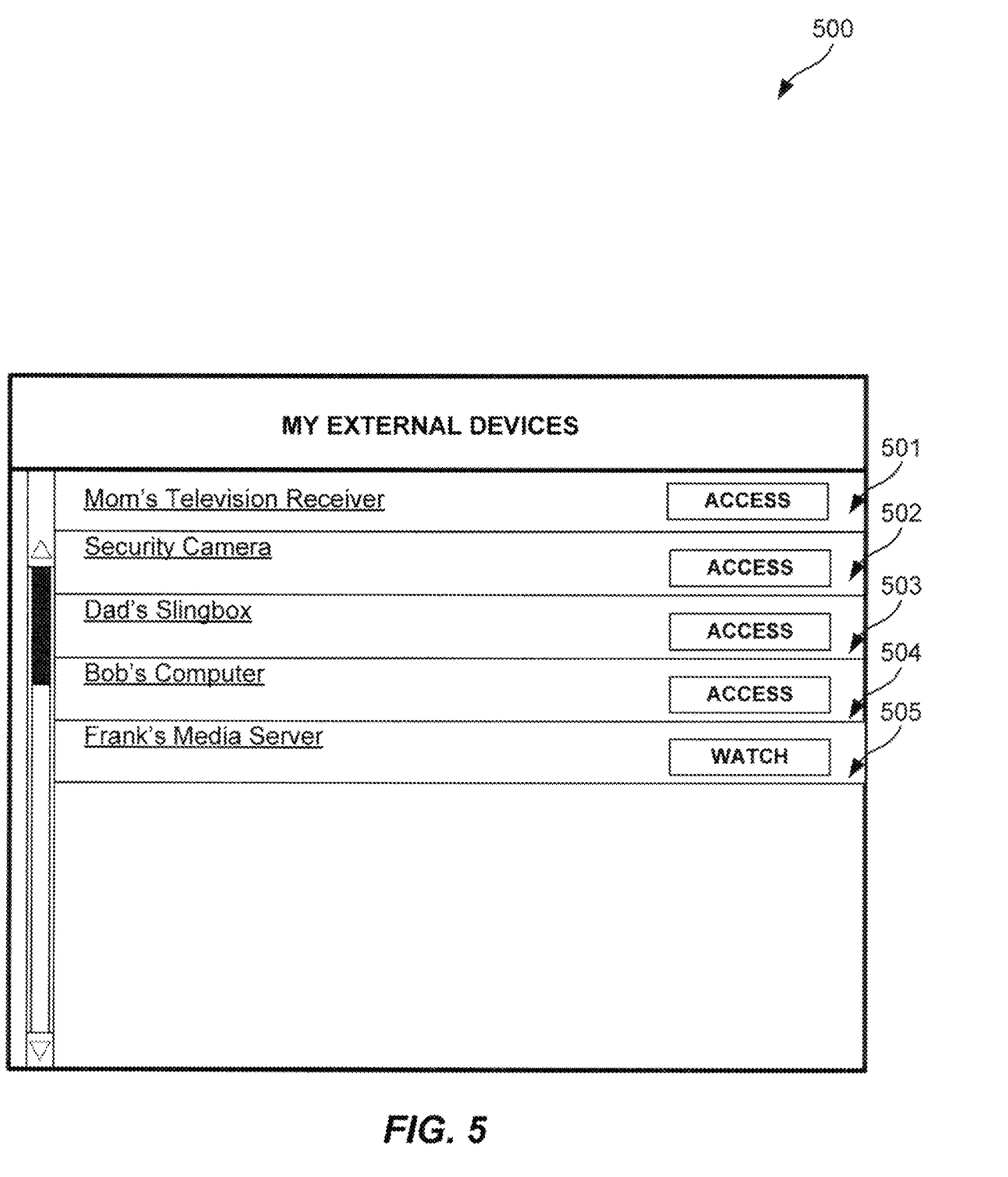
FIG. 5 illustrates an embodiment of a device selection menu.

The content identifier 403 allows the user to launch a device selection menu 500 (see FIG. 5). Responsive to the selection of the content identifier 403, the television receiver 106 initiates output of the device selection menu 500. The device selection menu 500 facilitates user access to one or more external devices via the television receiver 106.

For example, the content selection identifier 501 allows the user to request access to the second television receiver 108 through the first television receiver 106. In at least one embodiment, the first television receiver 106 may responsively connect to the second television receiver 108 and download data specifying content available via the television receiver (e.g., content recorded on the second television receiver 108 or linear channels available thereon). The first television receiver 106 may then display a content selection menu (e.g., similar to the content selection menu 300 of FIG. 3), which allows the user to select content on the second television receiver 108 for viewing. The second television receiver 108 then streams requested content to the first television receiver 106 for output to the presentation device 107.

Thus, a user of the first television receiver 106 may access stored content on a friend or family member's television receiver for viewing. For example, the second television receiver 108 may store user generated content that a user may desire to access at a remote location using the first television receiver 106. Thus, the user may placeshift the content from the second television receiver 108 to the first television receiver 106 for viewing.

In another scenario, the user may want to access other content stored on the second television receiver 108 using the first television receiver 106. For example, a user traveling at a hotel (location of the second television receiver 108) may want to access their own content stored on their personal television receiver 108. The second television receiver 108 may perform appropriate authentication procedures to verify the identity of the user and then stream recorded or live programming to the first television receiver 106 for viewing by the user in the hotel. In at least one embodiment, such user identification verification may be performed in association with cooperation of the info server 122. For example, the user's identity may be verified by the info server 122 in conjunction with the payment of a fee for the ability to placeshift the content from the second television receiver 108 to the first television receiver 106.

Returning attention to the device selection menu 500, the content identifier 502 allows the user to access the camera 112. Similarly, selection of the content identifier 503 facilitates access to the placeshifting device 114, selection of the content identifier 504 facilitates access to the computer 118 and selection of the content identifier 505 facilitates access to the content server 120. Selection of any of the content identifiers 501-505 may responsively initiate streaming of content from an external device to the first television receiver 106 or may initiate output of further content selection menus, depending on desired design criteria.

Figure 6:
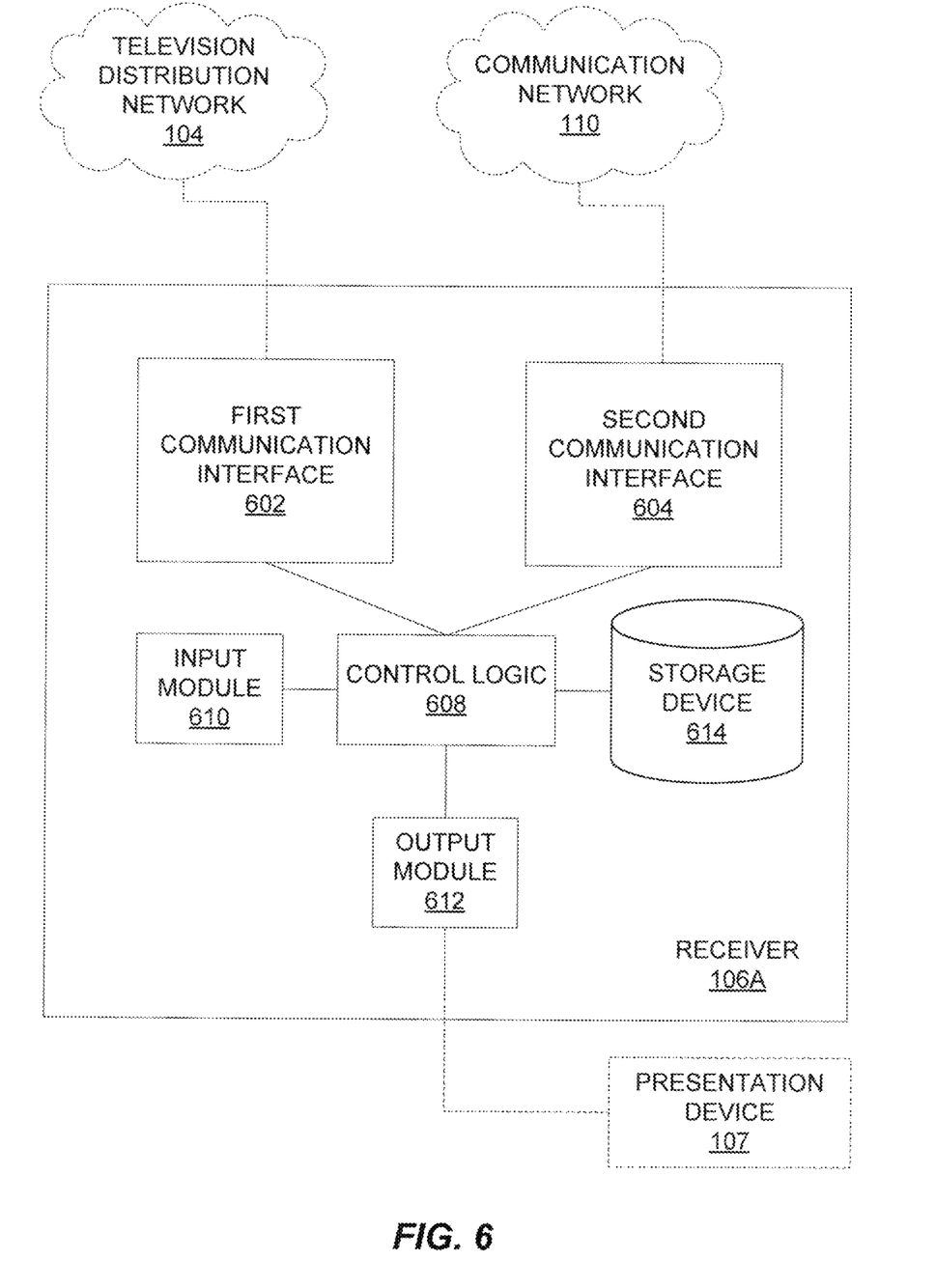
FIG. 6 illustrates an embodiment of a television receiver of FIG. 1.

FIG. 6 illustrates an embodiment of a first television receiver 106 of FIG. 1. The television receiver 106A is comprised of a first communication interface 602, a second communication interface 604, control logic 608, an input module 610, an output module 612 and a storage device 614. In at least one embodiment, the first communication interface 602 is comprised of a first communication interface 602 and a second communication interface 604.

The first communication interface 602 is operable to exchange information with television distribution network 104. More particularly, the first communication interface 602 is operable to receive audio/video content from the content source 102 (see FIG. 1) via the television distribution network 104. In at least one embodiment, the first communication interface 602 comprises a television tuner operable to receive a television signal containing television content from the communication network 110. For example, the first communication interface 602 may comprise one or more television tuners operable to receive television signals from one or more of an over the air (OTA) broadcast network, cable broadcast network and satellite broadcast network. The first communication interface 602 may also be configured to receive television programming from an internet protocol television (IPTV) network.

The second communication interface 604 is operable to exchange information with various external devices via the communication network 110. For example, the second communication interface 604 may receive audio/video content or other data from the television receiver 108 (see FIG. 1), the camera 112, placeshifting device 114, the computer 118, the content server 120 and/or the info server 122 via the communication network 110. The second communication interface 604 may also transmit data to each of the aforementioned devices, such as audio/video data stored thereupon or listing of content available through the television receiver 106A. In at least one embodiment, the second communication interface 604 is an Ethernet connection communicatively coupled to the internet or other type of data communication network. It is to be appreciated that other types of wired and wireless connections may be utilized, such as WiFi, depending on desired design criteria.

In at least one embodiment, the second communication interface 604 is operable to receive television signals from Internet Protocol (IP) sources as well as related content data from the communication network 104. The first communication interface 602 and the second communication interface 604 may be integrated into a single component or multiple components depending on desired design criteria. Furthermore, the first communication interface 602 and the second communication interface 604 may be operable to communicate with external devices using any number of physical and/or logical communication networks (e.g., the television distribution network 104 and/or the communication network 110).

The control logic 608 is operable for controlling the operation of the television receiver 106A. As used herein, control logic 608 refers to a single processing device or a group of inter-operational processing devices. The operation of control logic 608 may be controlled by instructions executable by control logic 608. Some examples of instructions are software, program code and firmware. Various embodiments of control logic 608 include any sort of microcontroller or microprocessor executing any form of software code. In at least one embodiment, the control logic 608 controls the reception of data and/or content by the first communication interface 602 and/or the second communication interface 604 and the output of content by the output module 612 to the presentation device 107. In at least one embodiment, the control logic 608 is operable to generate content or device selection menus, such as the electronic programming guide 200 (see FIG. 2), the content selection menu 300 (see FIG. 3), the electronic programming guide 400 (see FIG. 4) or the device selection menu 500 (see FIG. 5), for presentation by the presentation device 107.

The control logic 608 is communicatively coupled to the storage device 614, which is operable to store data during operation of the control logic 608. Such data may include software and firmware executed by the control logic 608 as well as system and/or program data generated during the operation of the control logic 608. In at least one embodiment, the storage device 614 is operable for storing identifiers and/or network locations of accessible external devices and/or authentication information associated with each external device. Storage device 614 may comprise any sort of digital memory (including any sort of read only memory (ROM), RAM, flash memory and/or the like) or any combination of the aforementioned.

In at least one embodiment, the television receiver 106A optionally includes a storage medium operable to persistently store data for use by the television receiver 106A. For example, the television receiver 106A may include recording functionality configured to persistently store video signals for subsequent playback by a user. The storage medium may comprise any type of non-volatile memory appropriate for storing video signals recorded by the television receiver 106A. Exemplary storage mediums include hard drives (e.g., magnetic memory), flash memory, battery backed up memory and the like.

The television receiver 106A also includes an output module 612 operable to interface with the presentation device 107. More particularly, the output module 612 is operable to output information for presentation by the presentation device 107 (see FIG. 1). The output module 612 may be operable to output any type of presentation data to the presentation device 107, including audio data, video data, audio/video (A/V) data, textual data, imagery or the like. In other embodiments, the output module 612 may comprise a network interface operable to transmit data to other components, devices or elements, such as other computers, servers and the like. The output module 612 may receive data from the control logic 608 and/or other components of the television receiver 106A for output to the presentation device 107 (see FIG. 1).

In at least one embodiment, the output module 612 may include multiple output connections operable to transmit data to the presentation device 107 in multiple formats through multiple communication mediums. For example, the output module 612 may include a modulator operable to modulate data onto an NTSC channel for transmission to the presentation device 107 through a coaxial cable. In other embodiments, the output module 612 may include composite or component outputs which communicatively couple to similar outputs of the presentation device 107 through appropriate cabling. In at least one embodiment, the output module 612 comprises a High Definition Multimedia Interface (HDMI) that outputs high definition content to the presentation device 107.

In at least one embodiment, the output module 612 bi-directionally communicates with the presentation device 107. For example, an HDMI port is capable of bi-directionally communicating with the presentation device 107. The output module 612 may receive various types of data from the presentation device 107 over the bi-directional communication link. For example, the presentation device 107 may transmit information identifying itself and/or its capabilities to the output module 612. Other bi-directional communication links, such as Ethernet, WiFi, IEEE 1394, USB and the like are also possible in accordance with various embodiments.

The input module 610 is operable to interface with one or more input devices, such as a remote control (see FIG. 1). The input device may comprise any type of device for inputting data to the television receiver 106A. More particularly, data received from the input device may be used to control the operation of the control logic 608 and/or the output of data to the presentation device 107. For example, the input data may be utilized to receive selections associated with electronic programming guides, content selection menus and/or device selection menus. The input module 610 and a remote control may be communicatively coupled using any type of wired or wireless connection, including USB, WiFi, infrared and the like. In some embodiments, the input module 610 may comprise a wireless receiver for receiving any type of RF or IR communication from a remote control. Exemplary input devices include keyboards, mice, buttons, joysticks, microphones, remote controls, touch pads and the like.

Figure 7:
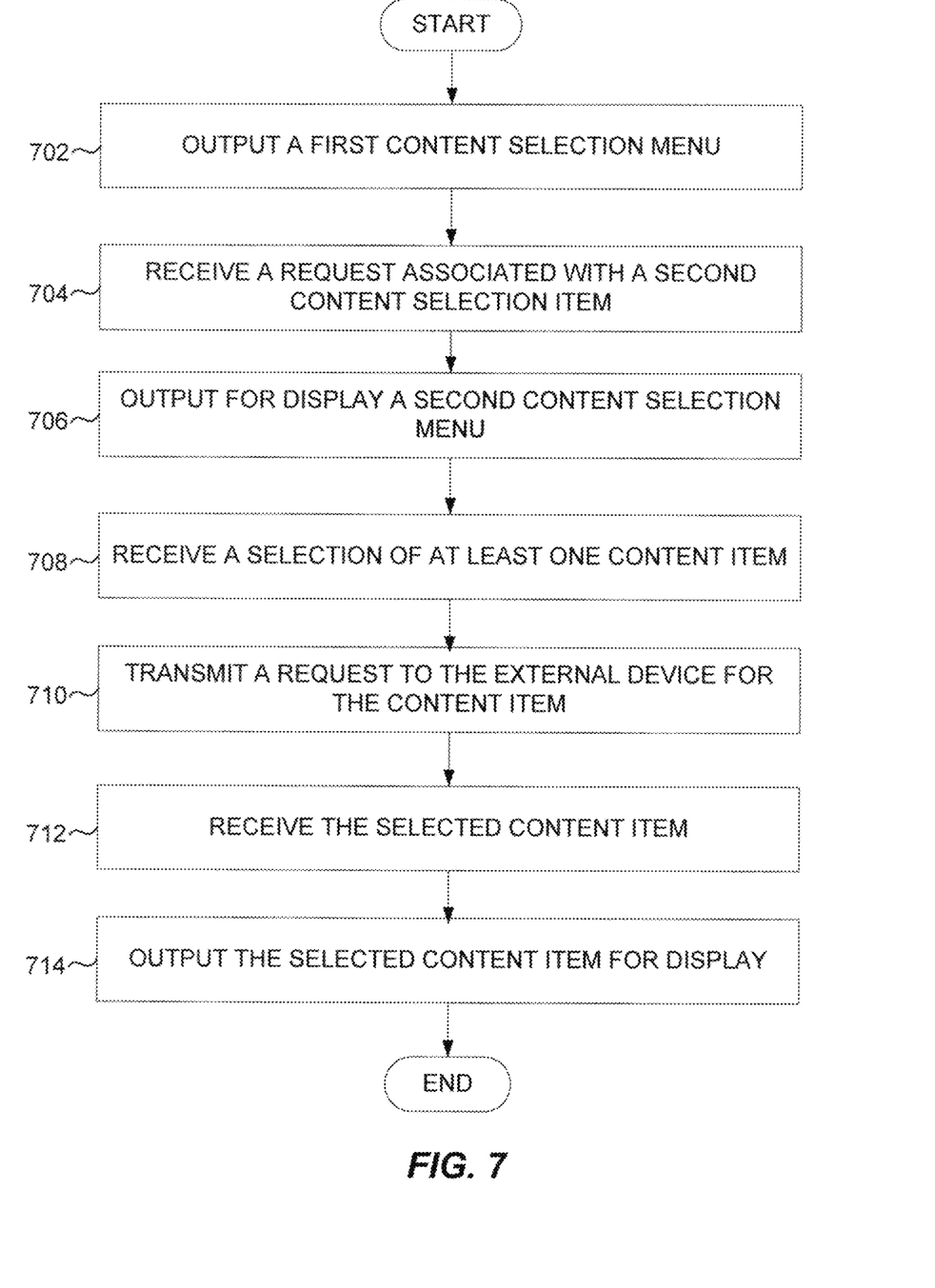
FIG. 7 illustrates an embodiment of a process for presenting available content to a user.

FIG. 7 illustrates an embodiment of a process for presenting available content to a user. The method of FIG. 7 will be described in the relation to the communication system 100 of FIGS. 1-6. More particularly, the process of FIG. 7 is discussed in relation to the television receiver 106A of FIG. 6. However, it is to be appreciated that the process of FIG. 7 may be performed by any type of entertainment device and/or television receiver. The process of FIG. 7 may include other operations hot illustrated for the sake of brevity.

The process includes outputting for display from a television receiver 106A a first content selection menu (operation 702). The first content selection menu may include at least a first content selection item associated with locally accessible content and a second content selection item associated with an external device. The electronic programming guide 200 is one exemplary content selection menu that may be output by the control logic 608 (see FIG. 6) during performance of operation 702.

The process further includes receiving a request at the control logic 608 associated with the second content selection item (operation 704). For example, the user may utilize a remote control to select a cell corresponding with an external device. The user input is received by the control logic 608 from the remote control via the input module 610.

The process further includes outputting for display from the television receiver a second content selection menu, (operation 706). The second content selection menu specifies at least one content item remotely available through the external device. The content selection menu 300 of FIG. 3 is one example of a content selection menu that may be output by the control logic 608 (see FIG. 6) during performance of operation 706.

The process further includes receiving, at the television receiver, a selection of the at least one content item (operation 708). For example, the user may select a particular recorded television program available on another television receiver 108 (see FIG. 1). The process further includes transmitting a request from the television receiver 106A to the external device requesting transmission of the selection content item (operation 710). For example, the control logic 608 (see FIG. 6) may generate a message requesting the selected television program and initiate transmission of the message to the other television receiver 108 via the second communication interface 604.

The process further includes receiving the selected content item at the television receiver 106A from the external device (operation 712) and outputting the selected content item from me television receiver 106A for presentation by a presentation device 107 (see FIG. 1) (operation 714). For example, the second communication interface 604 may receive content from the other television receiver 108 (see FIG. 1) via the communication network 110, The second communication interface 604 provides the received content to the control logic 608 for processing. The control logic 608 then transmits the content to the output module 612 for output to the presentation device 107. The presentation device 107 then displays the content to a user. Thus, through the techniques described herein, a user may easily navigate and access content stored on a plurality of devices via a television receiver using simplified content selection menus, such as integrated electronic programming guides.

Although specific embodiments were described herein, the scope of the invention is not limited to those specific embodiments. The scope of the invention is defined by the following claims and any equivalents therein.

I claim:

1. A method for presenting available content to a user, the method comprising:
   outputting for display from a television receiver a first content selection menu, the first content selection menu including at least a first content selection item of locally accessible content, wherein the locally accessible content is content of a linear television channel being currently broadcast to and received by the television receiver through a communicatively coupled television distribution network and a second content selection item associated with an external device, the second content selection item including a specific identifier that identifies a particular external device on which the entire content of at least one content item including an audio/video program is stored and accessible by the television receiver entirely from the external device;
   receiving a request, at the television receiver, associated with the second content selection item;
   outputting for display from the television receiver a content selection sub-menu, the content selection sub-menu specifying the at least one content item remotely available through the external device, the content selection sub-menu including the specific identifier that identifies the particular external device on which the entire content of the at least one content item including an audio/video program is stored and accessible by the television receiver entirely from the external device and the content selection sub-menu further including explicit identification of another external device through which content including live programming is accessible to be streamed live to the television receiver from the other external device;
   receiving, at the television receiver, from the content selection sub-menu, a selection of the at least one content item of which the entire content is stored and accessible by the television receiver entirely from the particular external device whose specific identifier that identifies the particular external device is included on the content selection sub-menu;
   in response to the selection, receiving at the television receiver from the external device the at least one content item of which the entire content is stored and accessible by the television receiver entirely from the particular external device whose specific identifier that identifies the particular external device is included on the content selection sub-menu; and
   outputting from the television receiver for presentation by a presentation device the at least one content item of which the entire content is stored and accessible by the television receiver entirely from the particular external device whose specific identifier that identifies the particular external device is included on the content selection sub-menu.

2. The method of claim 1, wherein the first content selection menu comprises an electronic programming guide.

3. The method of claim 2, wherein the electronic programming guide comprises a grid, the grid including a plurality of cells, with at least a portion of the cells of the grid corresponding with particular television programs.

4. The method of claim 3, wherein the particular television programs with which the at least the portion of the cells of the grid corresponds is the locally accessible content of the linear television channel being currently broadcast to and received by the television receiver through the communicatively coupled television distribution network.

5. The method of claim 1, further comprising:
   responsive to the request, transmitting an authentication command from the television receiver to the external device.

6. The method of claim 5, wherein transmitting the authentication command further comprises:
   storing at least one authentication credential at the television receiver prior to outputting for display the first content selection menu; and
   transmitting the stored authentication credential from the television receiver to the external device responsive to the request.

7. A television receiver comprising:
   a first communication interface operable to receive at least one audio/video program of a linear television channel broadcast to and received by the television receiver through the first communication interface from a television distribution network, the audio/video program associated with a content identifier;
   a second communication interface operable to communicate with an external device, the external device associated with a specific identifier that identifies the external device; and
   control logic operable to:
     cause the television receiver to be operable to receive a first request associated with the specific identifier associated with the external device that identifies the external device from a first content selection menu including at least a first content selection item of locally accessible content, wherein the locally accessible content is content of a linear television channel being currently broadcast to and received by the television receiver through the first communication interface and a second content selection item associated with the external device, the second content selection item including the specific identifier associated with external device that identifies the external device;
     cause the television receiver to be operable to output a content selection sub-menu for presentation by a presentation device responsive to the first request, the first content selection menu specifying at least one remote content item stored entirely on the external device or remotely available through the external device on a linear television channel being broadcast to and received by the external device and the content selection sub-menu further includes explicit identification of another external device through which content including live programming is accessible to be streamed live to the television receiver from the other external device; and
     cause the television receiver to be operable to receive, from the content selection sub-menu, a selection associated with the at least one remote content item specified on the content selection sub-menu and stored entirely on the external device or remotely available through the external device on a linear television channel being broadcast to and received by the external device;
   the second communication interface operable to receive, at the television receiver from the external device, the at least one remote content item specified on the content selection sub-menu and stored entirely on the external device or remotely available through the external device on a linear television channel being broadcast to and received by the external device;

the control logic operable to cause the television receiver to output, for presentation by the presentation device, the at least one remote content item specified on the content selection sub-menu and stored entirely on the external device or remotely available through the external device on a linear television channel being broadcast to and received by the external device, the content selection sub-menu including the specific identifier that identifies the external device.

8. The television receiver of claim 7, wherein the control logic is further operable to receive external data specifying the at least one remote content item remotely available through the external device, the control logic operable to generate the content selection sub-menu based on the external data.

9. The television receiver of claim 8, wherein the control logic is further operable to cause the television receiver to be operable to receive the external data from the external device, the control logic operable to generate the content selection sub-menu based on the external data.

10. The television receiver of claim 8, wherein the control logic is further operable to cause the television receiver to be operable to receive the external data from an external server separate from the external device.

11. The television receiver of claim 7, wherein the content identifier and identifier associated with the external device comprise channel identifiers and the first request comprises user input specifying a channel identifier identifying the external device.

12. A television receiver comprising:
a first communication interface operable to receive at least one audio/video program of a linear television channel broadcast to and received by the television receiver through the first communication interface from a television distribution network, the audio/video program associated with a content identifier;
a second communication interface operable to communicate with a plurality of external devices each having at least one different audio/video program entirely stored thereon accessible by the television receiver;
control logic operable to:
output a first content selection menu for presentation by a presentation device, the first content selection menu specifying the content identifier and an identifier associated with a device selection menu;
cause the television receiver to be operable to receive a first request associated with the identifier associated with the device selection menu, the device selection menu including a selectable list of the plurality of external devices, wherein the device selection menu includes a specific identifier for each external device of the plurality of external devices that identifies the external device of the plurality of external devices;
cause the television receiver to be operable to output the device selection menu for presentation by the presentation device responsive to the first request;
cause the television receiver to be operable to receive a selection, from the device selection menu, of an external device from the list of the plurality of external devices responsive to the output of the device selection menu; and
in response to the selection, from the device selection menu, of the external device from the list of the plurality of external devices, output a content selection sub-menu for presentation by the presentation device, the content selection menu specifying at least one content item remotely available through the selected external device and the content selection sub-menu further includes explicit identification of another external device through which content including live programming is accessible to be streamed live to the television receiver from the other external device;
the second communication interface operable to, in response to the selection from the content selection sub-menu, communicate with the selected external device to receive a remote content item stored entirely on the selected external device, the content selection sub-menu including the specific identifier that identifies the external device;
the control logic operable to output the remote content item for presentation by the presentation device.

13. The television receiver of claim 12, wherein the first content selection menu specifies a plurality of content identifiers of content items available for selection recorded by and stored on the television receiver.

14. The television receiver of claim 13, wherein the control logic is further operable to cause the television receiver to be operable to:
receive a selection of the at least one content item; and
in response to the selection of the at least one content item, initiate a content request to the selected external device for the at least one content item;
the second communication interface operable to receive the selected content item from the selected external device; and
the control logic operable to output the selected content item for presentation by the presentation device.

15. The television receiver of claim 12, wherein the first content selection menu comprises a grid, the grid including a plurality of cells, with at least a first portion of the cells of the grid corresponding with linear television channels and particular television programs thereon being broadcast to and received by the television receiver through a communicatively coupled television distribution network, a second portion of the cells of the grid including the identifier associated with the device selection menu and a third portion of the cells of the grid corresponding with other external devices.

16. The television receiver of claim 12, wherein the content identifier associated with the audio/video program and the identifier associated with the device selection menu comprise channel identifiers and the first request comprises user input specifying the a channel identifier associated with the device selection menu.

17. The television receiver of claim 12, further comprising: a storage device operable to store at least one authentication credential prior to the control logic outputting for display the device selection menu; the control logic operable to initiate transmission of the stored authentication credential to the selected external device responsive to the received selection of the external device from the list of the plurality of external devices.

* * * * *